US008789163B2

(12) United States Patent
Cahn

(10) Patent No.: US 8,789,163 B2
(45) Date of Patent: Jul. 22, 2014

(54) ON-LINE MEMBERSHIP VERIFICATION UTILIZING AN ASSOCIATED ORGANIZATION CERTIFICATE

(76) Inventor: Robert S. Cahn, Carmel, NY (US)

( * ) Notice: Subject to any disclaimer, the term of this patent is extended or adjusted under 35 U.S.C. 154(b) by 221 days.

(21) Appl. No.: 13/372,613

(22) Filed: Feb. 14, 2012

(65) Prior Publication Data

US 2012/0216253 A1 Aug. 23, 2012

Related U.S. Application Data

(60) Provisional application No. 61/444,753, filed on Feb. 20, 2011.

(51) Int. Cl.

| | |
|---|---|
| ***G06F 7/04*** | (2006.01) |
| ***G06F 15/16*** | (2006.01) |
| ***G06F 17/30*** | (2006.01) |
| ***H04L 29/06*** | (2006.01) |
| ***G06Q 20/40*** | (2012.01) |
| ***G06F 21/33*** | (2013.01) |

(52) U.S. Cl.

CPC ............ *G06F 21/33* (2013.01); *H04L 63/1483* (2013.01); *G06Q 20/40* (2013.01); *H04L 63/0823* (2013.01)

USPC ............................................ 726/10; 713/156

(58) Field of Classification Search

CPC .............. H04L 9/3281; H04L 63/1483; H04L 63/0823; H04N 21/8358; H04N 1/32144; H04N 2201/3233; G11B 20/00086; G06Q 20/40

USPC .............. 713/155–158, 173, 175–180; 726/2, 726/6–7, 10, 18–19, 21, 26–30, 32

See application file for complete search history.

(56) References Cited

U.S. PATENT DOCUMENTS

| | | | | |
|---|---|---|---|---|
| 7,631,183 | B2 * | 12/2009 | Brown et al. | 713/157 |
| 2002/0059364 | A1 * | 5/2002 | Coulthard et al. | 709/203 |
| 2004/0030784 | A1 * | 2/2004 | Abdulhayoglu | 709/227 |
| 2004/0078564 | A1 * | 4/2004 | Abdulhayoglu | 713/156 |
| 2005/0177715 | A1 * | 8/2005 | Somin et al. | 713/156 |
| 2006/0095388 | A1 | 5/2006 | Brown et al. | |
| 2009/0178130 | A1 | 7/2009 | Botz et al. | |
| 2010/0083347 | A1 | 4/2010 | Hinton | |

* cited by examiner

*Primary Examiner* — Michael S McNally
*Assistant Examiner* — Trong Nguyen
(74) *Attorney, Agent, or Firm* — Wendy W. Koba

(57) ABSTRACT

A system and method is presented for providing verification of specified credentials to an independent person (a third party, that is, a user of a purported member's website) through the utilization of an "organization certificate" (OC) in combination with a "membership certificate" (MC), with the field structure of the OC limiting the type of information that can be certified by the issuing organization. The set of fields in the OC is defined as associated with a particular type of organization, where any extraneous information will not be permitted to form part of a legitimate membership certificate (hereinafter "MC"). The use of specific field descriptions thus assumes that any field appearing in an MC that does not have a corresponding <field> tag in the OC will cause the MC to be flagged as invalid by the user's browser extension during the verification process.

27 Claims, 5 Drawing Sheets

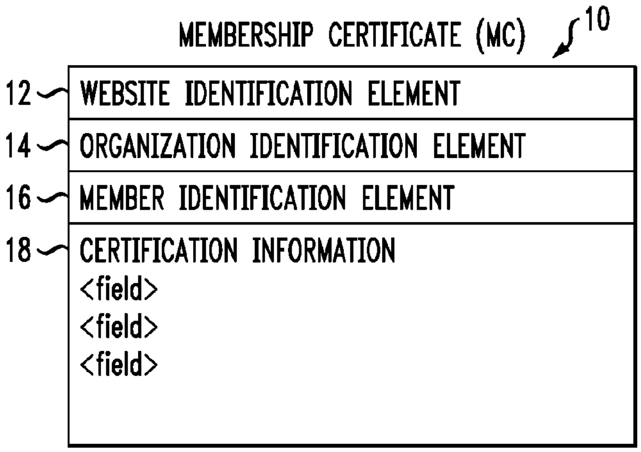

FIG. 1

MEMBERSHIP CERTIFICATE (MC) — 10

- 12 — WEBSITE IDENTIFICATION ELEMENT
- 14 — ORGANIZATION IDENTIFICATION ELEMENT
- 16 — MEMBER IDENTIFICATION ELEMENT
- 18 — CERTIFICATION INFORMATION
  <field>
  <field>
  <field>

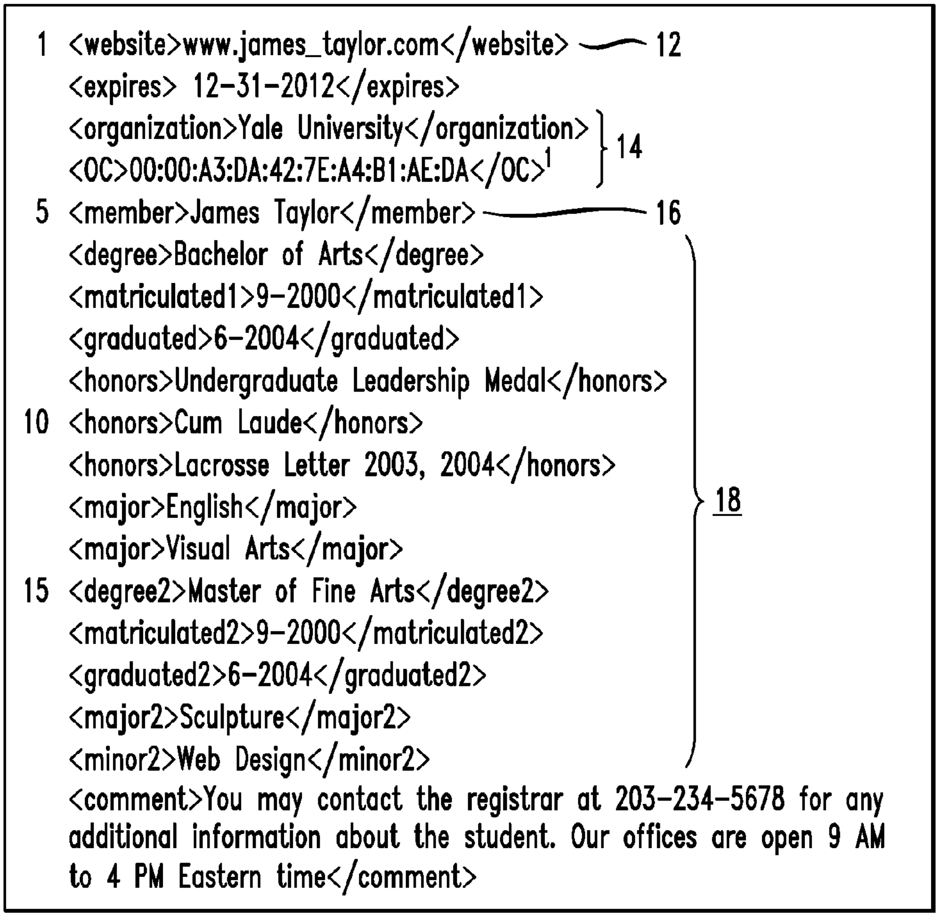

FIG. 2

```
1  <website>www.james_taylor.com</website>  —— 12
   <expires> 12-31-2012</expires>
   <organization>Yale University</organization>  } 14
   <OC>00:00:A3:DA:42:7E:A4:B1:AE:DA</OC>¹
5  <member>James Taylor</member>  —— 16
   <degree>Bachelor of Arts</degree>
   <matriculated1>9-2000</matriculated1>
   <graduated>6-2004</graduated>
   <honors>Undergraduate Leadership Medal</honors>
10 <honors>Cum Laude</honors>
   <honors>Lacrosse Letter 2003, 2004</honors>
   <major>English</major>
   <major>Visual Arts</major>                        } 18
15 <degree2>Master of Fine Arts</degree2>
   <matriculated2>9-2000</matriculated2>
   <graduated2>6-2004</graduated2>
   <major2>Sculpture</major2>
   <minor2>Web Design</minor2>
   <comment>You may contact the registrar at 203-234-5678 for any
   additional information about the student. Our offices are open 9 AM
   to 4 PM Eastern time</comment>
```

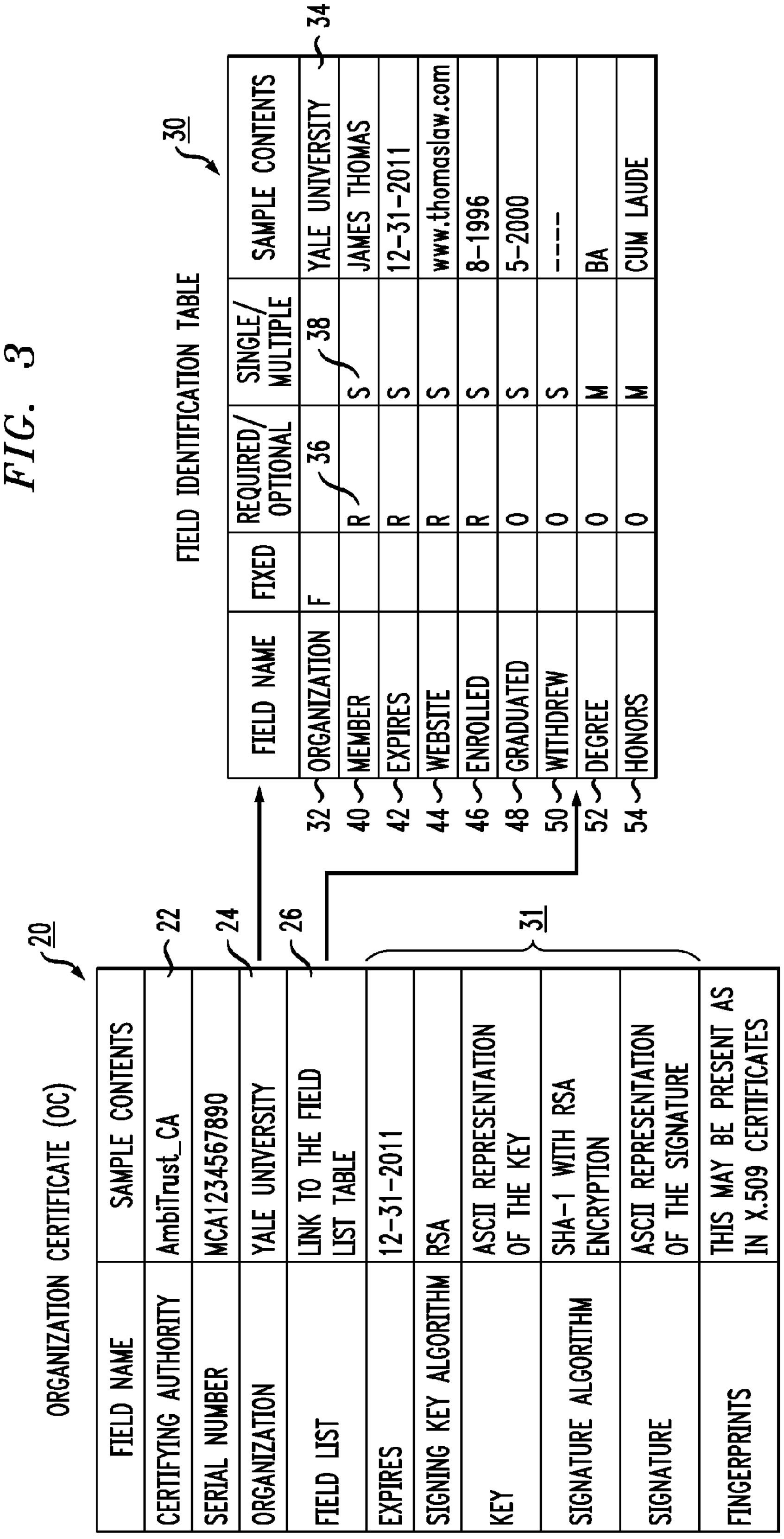
FIG. 3
FIELD IDENTIFICATION TABLE
30
FIELD NAME
FIXED
REQUIRED/ OPTIONAL
SINGLE/ MULTIPLE
SAMPLE CONTENTS
34
32 ORGANIZATION F YALE UNIVERSITY
36
38
40 MEMBER R S JAMES THOMAS
42 EXPIRES R S 12-31-2011
44 WEBSITE R S www.thomaslaw.com
46 ENROLLED R S 8-1996
48 GRADUATED O S 5-2000
50 WITHDREW O S ----
52 DEGREE O M BA
54 HONORS O M CUM LAUDE
ORGANIZATION CERTIFICATE (OC)
20
FIELD NAME
SAMPLE CONTENTS
CERTIFYING AUTHORITY AmbiTrust_CA
22
SERIAL NUMBER MCA1234567890
24
ORGANIZATION YALE UNIVERSITY
26
FIELD LIST LINK TO THE FIELD LIST TABLE
31
EXPIRES 12-31-2011
SIGNING KEY ALGORITHM RSA
KEY ASCII REPRESENTATION OF THE KEY
SIGNATURE ALGORITHM SHA-1 WITH RSA ENCRYPTION
SIGNATURE ASCII REPRESENTATION OF THE SIGNATURE
FINGERPRINTS THIS MAY BE PRESENT AS IN X.509 CERTIFICATES

*FIG. 4*

CA FIELD 22

<OC_version>I</OC_version>
<OC_serial_number>00:00:A3:DA:42:7E:A4:B1:AE:DA</OC_serial_number>
<issuer_number>00:00</issuer_number>
<issuer_parent>00:00</issuer_parent>
<issuer>Verify Membership Inc.</issuer>
<issuer_URL>verify-membership.com</issuer_URL>
<issuer_phone_number>1-845-555-1212<issuer_phone_number>
<issuer_email>OC_information@verify-membership.com</issuer_email>
<issuer_signature_algorithm>PGP</issuer_signature_algorithm>
<certificate_verification_level>1</certificate_verification_level>
<issuer_CRL_URL>www.verify-membership.com/CRL</issuer_CRL_URL>

*FIG. 5*

ORGANIZATION ID FIELD 24

<organization>Yale University</organization>
<Sub_organization>Yale College</Sub_organization>
<organization_common_name>Yale</organization_common_name>
<organization_street_address>123 Elm Street. New Haven. Ct</organization_street_address>
<organization_country>USA</organization_country>
<organization_telephone>1-203-555-1212</organization_telephone>
<organization_website>www.yale.edu</organization_website>
<organization_industry>Higher Education</organization_industry>
<organization_CRL_URL>www.yale.edu/registrar/CRL</organization_CRL_URL>

50

| NAME | REQUIRED/OPT | SINGLE/MULT | REQUIRES | PRODUCES |
|---|---|---|---|---|
| DEGREE2 | O | S | DEGREE | MATRICULATED2, GRADUATED2 |
| MATRICULATED2 | O | S | DEGREE2 | |
| GRADUATED2 | O | S | DEGREE2 | |

ON-LINE MEMBERSHIP VERIFICATION UTILIZING AN ASSOCIATED ORGANIZATION CERTIFICATE

CROSS-REFERENCE TO RELATED APPLICATIONS

This application claims the benefit of U.S. Provisional Application No. 61/444,753, filed Feb. 20, 2011 and herein incorporated by reference.

TECHNICAL FIELD

The present invention relates to a system and method of providing on-line verification of specified, limited credentials from an authorized organization without requiring second site authentication.

BACKGROUND OF THE INVENTION

The question of on-line identity has been an active area of research for a number of years. The question of whether a person or organization is who they claim to be has produced a number of web-based innovations. Often associated with on-line retailers, a web site may include a link to another site that purports to "verify" the authenticity of the on-line retailer. By clicking on the link, a user (such as a potential customer) is re-directed to another web page displaying the "certificate" of the on-line retailer. In general, these systems are referred to as "second site authentication" and have (unfortunately) been found to be relatively easy to forge. Domain names that are relatively similar to reputable "verification services" may be purchased by unscrupulous individuals who may then create 'fake' certificates and present them to unwary third parties looking for verification of a certain product or service. Simply put, good sites send you to other good sites for authentication, bad sites send you to other bad sites. Moreover, the proliferation of bad sites in the marketplace of second site authentication services remains problematic. While some browser add-ons may alert the user to "bad sites", this solution results in a race between the bad guys who create new bad sites, and the people who administer the add-ons and have the task of continually updating the identification of bad sites. Indeed, this approach is the same as the one used by parental control tools to warn of internet-based sexual material. Experience has thus shown that the race is never over, and there will always be ways to access untoward information.

One prior art attempt to address some of these problems is disclosed in US Patent Application Publication 2009/0177694, issued on Jul. 9, 2009 to Paul L. Olson. In this disclosure, a central repository is created for storing all authenticated credentials, where each credential is formed to include a checksum. An individual interested in reviewing a particular credential then accesses the repository, retrieves the desired credential and the checksum is calculated and presented for verification. The existence of a match is thus considered to authenticate the credential to the individual.

While an advance over the more general second site authentication processes, it is still possible for someone to implement the system of Olson so as to set up and maintain a "faux site" for holding fake credentials in a similar manner. One reason this is possible is that the originating organizations (e.g., professional associations, colleges, licensing organizations and the like) do not retain control of the certificates, but pass them off to the repository. Further, there is no indication that any kind of expiration of a credential is included with the data stored in the repository.

Previous work by the inventor, embodied in U.S. patent application Ser. No. 12/829,550 filed Jul. 2, 2010 and herein incorporated by reference, addresses many of the drawbacks of the prior art. However, as will be discussed in detail below, the prior system did not limit the "type" of information that could conceivably be included in a certification, which could allow misrepresentations to occur.

For example, if the credentialing organization is Yale University, it is fine for Yale to certify the degree(s) it granted to an individual. However, Yale is not considered to be a preferred source of information for job history, military service or citizenship. Thus, a need remains for an arrangement that also controls the type of information that is verified by the certifying organization.

SUMMARY OF THE INVENTION

These and other limitations of the prior art are addressed by the present invention, which relates to a system and method of providing on-line verification of specified, limited credentials from an authorized organization without requiring second site authentication.

In particular, the present invention describes a system and method for providing verification of specified credentials to an independent person (a third party, that is, a user of a purported member's website) through the utilization of an "organization certificate" (OC) in combination with a "membership certificate" (MC), with the field structure of the OC limiting the type of information that can be certified by the issuing organization.

Similar to the standard X.509 certificates that are issued by a Certificate Authority (CA), an OC as used in the methodology of the present invention will be issued to an organization by a CA that first vets the organization and verifies its public key.

In accordance with the present invention, an organization certificate (hereinafter "OC") is proposed that utilizes a predetermined set of fields that are controlled by the CA to ensure that the information contained in the MC is credible. The set of fields in the OC is defined as associated with a particular type of organization, where any extraneous information will not be permitted to form part of a legitimate membership certificate (hereinafter "MC"). The use of specific field descriptions thus assumes that any field appearing in an MC that does not have a corresponding <field> tag in the OC will cause the MC to be flagged as invalid by the user's browser extension during the verification process.

In a further embodiment of the present invention, the number of checks associated with each field can be extended in order to verify attributes of one or more specific fields. Additionally, it is possible to include a listing of "revoked" OC's that is reviewed in the process of verifying an MC in accordance with the present invention.

In accordance with the present invention, a system and method is provided that utilizes protocols and cryptography to assure customers (generally referred to hereinafter as "users") that they are dealing with a person (or organization) that can present credible proof of their identification in conjunction with their website. The system is launched directly from the user's browser such that the certificate verification process is performed "locally", without needing to go out and obtain information from another (perhaps unscrupulous) web site. An expiration date is preferably included within both the OC and MC in order to ensure that neither certificate is "stale", as well as to create a fixed date upon which the certificates will expire.

It is an aspect of the present invention that the organization and membership certificates provided by the system and method are difficult to forge or steal. While it is possible for a knowledgeable (i.e., computer-savvy) user to manually verify the authenticity of the certificates, the preferred embodiment of the inventive system is based upon the creation of a new MIME (i.e. Multipurpose Internet Mail Extensions) type that is employed by the user's browser and utilizes public keys associated with the credentialing organizations in combination with a public key of the originating certification authority (CA). Unlike the prior art, the credentialing organization retains control of the membership certificate.

In one embodiment, the present invention comprises a computer implemented method for verifying a membership certificate, presented as an icon or hyperlink on a purported member's website, comprising the steps of: activating the membership certificate icon, retrieving an organization certificate associated with the organization that created the membership certificate (the organization certificate including a predetermined set of information elements defining the membership), comparing the presented elements in the membership certificate with the organization certificate, and verifying the membership certificate if and only if the presented elements in the membership certificate match the predetermined set of information elements within the organization certificate, and then verifying the signature of the membership certificate against the public key published in the organization certificate.

In another embodiment, the present invention defines a computer usable program product comprising a computer usable medium including computer usable code for verifying a membership certificate, presented as an icon on a purported member's website, including computer usable code for activating the membership certificate icon, computer usable code for retrieving an organization certificate associated with the organization that created the membership certificate (the organization certificate including a predetermined set of information elements defining the membership), computer usable code for comparing the presented elements in the membership certificate with the organization certificate, and computer usable code for verifying the membership certificate if and only if the presented elements in the membership certificate match the predetermined set of information elements within the organization certificate, and then verifying the signature of the membership certificate against the public key published in the organization certificate.

In still a further embodiment, the present invention discloses a system for verifying a membership certificate, presented as an icon on a purported member's website, including computer usable code means for activating the membership certificate icon, computer usable code means for retrieving an organization certificate associated with the organization that created the membership certificate (the organization certificate including a predetermined set of information elements defining the membership), computer usable code means for comparing the presented elements in the membership certificate with the organization certificate, and computer usable code means for verifying the membership certificate if and only if the presented elements in the membership certificate match the predetermined set of information elements within the organization certificate.

Other and further aspects and embodiments of the present invention will become apparent during the course of the following discussion and by reference to the accompanying drawings.

BRIEF DESCRIPTION OF THE DRAWINGS

Referring now to the drawings,

FIG. 1 is a basic diagram of a membership certificate (MC) formed in accordance with the present invention;

FIG. 2 contains a listing of an exemplary MC;

FIG. 3 is a basic diagram of an organization certificate (OC) and associated field identification table formed in accordance with the present invention;

FIG. 4 contains a listing of the certification authority portion of an exemplary OC;

FIG. 5 contains a listing of the organization identification portion of an exemplary OC;

DETAILED DESCRIPTION

Figures 6, 7:
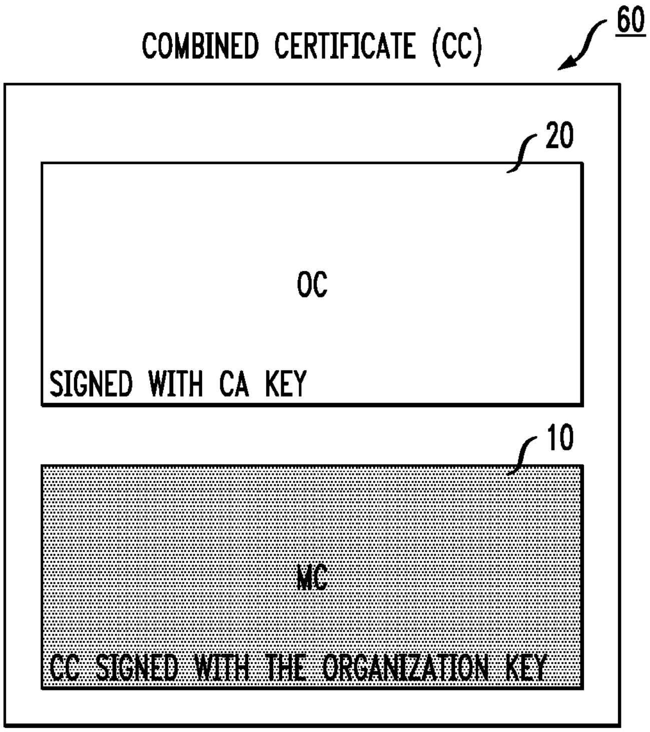
FIG. 6 illustrates an expanded type of field identification table that may be used in the process of the present invention.
FIG. 7 is a basic diagram of a combined certificate (CC) embodying both an OC and an MC.

As will be described in detail below, the present invention utilizes an organization certificate (OC) to create a membership certificate (MC) that can thereafter be accessed by a third party to verify that the "member" (such as an individual, business, corporation or the like) is legitimately associated with a participating (credentialing) organization (i.e., university, licensing organization, professional organization). In particular, the OC is structured to limit the type of information that can be contained within the MC to only that information pertinent to the issuing organization.

It is contemplated that the present invention will be utilized by the public to verify the authenticity of a particular individual or business (or any other type of entity) when visiting their website. The website will include an MC icon (or hyperlink) that can be activated and used to trigger the verification process in real time. Thus, an individual (hereinafter defined as a "user") visiting the website will see the "membership" icon/hyperlink and will click on that location to perform the verification process. If successful, the process will then display a verified certificate for visual inspection by the user and, if the process fails for some reason, an error/failure message will be displayed for the user. The user's browser is presumably configured to include an add-on necessary to perform the verification process, including the identity of all valid OC's, where the specifics of the system as employed by the user are described in detail in my co-pending application Ser. No. 12/829,550 and herein incorporated by reference.

FIG. 1 includes, in a high-level diagram format, the type of information included in an exemplary membership certificate, here defined as MC 10. The ordering of the elements of MC 10 is not critical and should not be considered to limit the scope of the present invention. As shown, MC 10 includes a website identification element 12, which defines the website associated with this particular MC. The inclusion of the website information prevents an unscrupulous individual from "stealing" the MC and re-publishing it on another website. MC 10 also includes an organization identification element 14, which will include information defining the organization issuing the MC, including a "certifying" serial number provided by a certification authority (CA) that initially approved the organization certificate (OC). As briefly discussed below, and described in my co-pending application in detail, a CA is presented documentation confirming that a "requesting organization" is indeed who it purports to be. The information is then vetted (to a greater or lesser degree, depending on the situation) and upon confirmation, the CA issues an OC with a unique serial number to the requesting organization, where that number is then included in its OC and every issued MC. An identification of the specific "member" associated with MC 10 (the individual/company of the website being visited by the user) is included as member element 16 in MC 10. The payload portion 18 of MC 10, as shown in FIG. 1, includes the specific information pertaining to the individual that the issuing organization is permitted to include in the MC, as structured by specific field tags.

FIG. 2 includes an exemplary listing of MC 10, with line 1 corresponding to website identification element 12. Importantly, line 2 of the listing includes the expiration date of this specific MC, where as noted above it is important that the information in an MC not become "stale", and an expiration date is included to further ensure the authenticity of the certified information. The following two lines embody organization identification element 14, including both the name of the issuing organization (here, Yale University) and a specific, unique serial number issued to Yale University by the overseeing CA. Line 5 of the listing includes an identified of the specific "member" associated with MC 10, included as element 16 in the diagram of FIG. 1.

In accordance with the present invention, the remaining fields in the listing of FIG. 2 are specifically tagged and include the detailed information permitted to be supplied by the issuing organization (i.e., the "payload" portion 18 of MC 10). As will be discussed in detail below, different ones of the fields have different properties, where some may include only a "single" piece of information, some "multiple". Additionally, some fields may be "mandatory" where others are "optional". Obviously, these properties are specific to type of MC being issued, where a university will have one set of fields and properties and a licensing organization such as the AMA will have another. Indeed, it is a significant aspect of the present invention that the type of information supplied in an MC by the issuing organization is controlled by the set of fixed fields identified in the OC and MC.

In comparison to my previous arrangement as described in co-pending application Ser. No. 12/829,550, the OC takes the place of signed GPG keys or signed X.509 certificate associated with verifying the organization. In general, the OC will be loosely based on the X.509 certificate, but with several key differences. The OC will contain more information about an organization than is contained in a standard X.509 certificate. Also, as will be discussed below, an OC is not able to "chain" Certification Authority (CA) to CA, in the manner permitted by X.509 certificates, but will need to be signed by all organizations going back to the "root" CA.

More particularly, an OC of the present invention requires a selected set of elements (which may be implemented differently) that include: (1) an identification of the certifying authority, (2) an identification of the organization; (3) field identifications defining the specific information provided by the organization; (4) the organization's public key; and (5) the validity period of the OC (i.e., expiration date). FIG. 3 illustrates an exemplary OC 20 that contains these elements, where OC 20 is then used to validate (or invalidate, as the case may be) an MC presented for verification by a user viewing a purported "member's" website.

As shown in FIG. 3, OC 20 contains a number of separate fields specifying the elements discussed above. In particular, OC 20 includes a first field 22 defining the "certifying authority" (CA) that issued the OC and assigned a unique serial number to the organization. The next field 24 within OC 20 identifies the specific organization for whom this certificate has been created. A field identification pointer 26 is included in OC 20 and is used to direct the process to a separate field identification table 30, as shown in FIG. 3. As will be discussed in detail below, field identification table 30 includes the specific, tagged fields that are populated by an organization when creating an MC. Lastly, OC 20 includes a validation field 28, which includes the public key of the issuing organization and, preferably, an expiration date for OC 20.

In order to properly govern the licensing and revenues generated by MCs, an OC will need to be signed by all the issuers in the chain back to the root CA. Alternatively, the OC can be signed by the originating CA (i.e., the CA "closest" to OC in the chain) and the root CA. This aspect is utilized to allow for commercial relationships between the various CAs to be enforced.

This can be illustrated by example. It is presumed that CA1 is the root CA, and will sign all the OC's generated worldwide. CA1 enters into a commercial relationship with CA2 to issue organization certificates for the country of Canada. CA2, in turn, enters into a relationship with CA3 to issue certificates for the province of Ontario.

If the University of Toronto then desires to obtain an OC in order to issue MCs to its graduates, it would be directed to contact CA3. Subsequently, CA3 performs the due diligence required to validate the University of Toronto and signs an OC for the university. It then forwards the signed OC and supporting documentation to CA2 for its signature, where the package is then forwarded to CA1 for the final signature. This process ensures that there is a consistent process for vetting organizations and the orderly accounting for commercial relationships.

It is to be understood that the browser extension that processes the OC will need to verify only the "outer" signature by CA1—the "inner" signatures by CA2 and CA3 can possibly be ignored (the presumption being that CA1 will only be found if the preceding authorities reviewed and approved the OC). Alternatively, the browser extension can maintain a database of all CA public keys and verify each one of the signatures included in the CA.

FIG. 4 is a listing of an exemplary CA field 22 as contained within OC 20, where this portion of OC 20 is seen to resemble the fields in an X.509 certificate. In this case, "Verify Membership, Inc." is shown line 5 of the listing as the certifying authority. The serial number as shown in line 2 of FIG. 4 begins with the CA's identification number. In this particular embodiment, the number 00:00 is shown and is defined as the "root", since it is the same as the "issuer parent". The verification system of the present invention may utilize a single root authority, or multiple roots as governed by business decisions and efficiency of operations. As shown in FIG. 4, the CA includes extensive contact information in this portion of OC 20, so as to allow for a user involved in verifying a particular MC to have access to all necessary information. In the particular embodiment as shown in FIG. 4, an indication of "verification level" is included at line 10 in this portion of OC 20 and refers to the extent of vetting performed by the CA to determine the identity of the organization and its history. The inclusion of this "level" information allows for higher and lower levels of trust in the information ultimately supplied by the organization in their MCs.

FIG. 5 contains an exemplary listing for organization identification field 24 of OC 20, in this case for the "organization" Yale University (for explanatory purposes only). This listing is seen to include various details for Yale University, such as address, telephone and website information. As mentioned above, a specific OC configured in accordance with the present invention identifies the issuing organization in greater detail than a standard X.509 certificate. As a result, a user viewing a particular MC will also be privy to any necessary background information associated with the organization issuing the MC in the first instance.

A significant aspect of the present invention is the control of the type of information that can be "certified" by a particular organization. In this case of an educational institution, the information type is limited to dates of matriculation and graduation, degrees conferred, honors, and the like. In order to provide this control on the type of information that an organization is permitted to "certify" on an MC, OC utilizes field identification table 30, as shown in FIG. 3, which includes a specific, limited set of descriptors that may be included in a MC issued by the organization. Obviously, if a specific table being reviewed during the course of validating a presented MC contains any fields not mentioned by name, OC 20 is rejected as invalid.

Referring to FIG. 3, it is clear that field identification table 30 includes information associated with a university (or any type of educational institute). It is to be understood that in accordance with the present invention, other types of organizations will utilize a different, specific set of fields in a table that defining information pertinent to affirming membership in that organization. For example, an OC associated with the American Red Cross may utilize a field list identification table that confirms only the blood type of the "member" and, perhaps, the last time the member donated blood.

Referring now to table 30, a number of specific fields are shown, where each field also includes a set of specific properties defining that field. As shown, a first field 32 defines the particular "organization" associated with the specific OC that originated the query to this table. In this case, the "contents property" 34 is shown as "Yale University" (where, obviously, if this does not match the organization definition in the originating OC, the process is halted and the OC is deemed invalid). This field is preferably defined in the table as a "fixed" entry, which is a field that is always required and can appear only once in the table. Obviously, the identification of the certifying organization is this type of information.

Continuing, a member field 40 in field identification table 30 identifies the particular "member" requesting an MC. Member field 40 includes two properties, defined as including a "required/optional" indicator 36 and a "single/multiple" indicator 38. The "required" designation in indicator 36 defines information that must be included in the issued MC; if it is "missing" during a verification of the MC, the user's browser will create an error message (and the user can then assume that the offered MC is a fake or misformed). Similarly, the "single" designation in indicator 38 means that only one instance of this particular field can be included in an MC (where "single" also allows for this field to be "missing" if not also defined as "required"). If it includes multiple entries, the user's browser running the certification process will again issue an error message. Obviously the identification of the "member" associated with an MC is both required and must be single. The member's name (in this example shown as "James Thomas") is included in the contents portion of the field.

The certificate expiration is included in field 42 (again, "required", "single") and the website upon which the MC will appear is contained in field 44 ("required", "single"). It is to be presumed that regardless of the type of organization, these first four fields will be included in most issued certificates (perhaps at different locations and in a different order within the table).

The following fields shown in table 30 are pertinent to the specifics of having a university as the OC. As shown, field 46 specifies the date the individual enrolled ("required", "single"), followed in field 48 by the date the individual graduated. Since not everyone who enrolls in an institution will graduate, this field is "optional", as shown by identifier 46 (while it retains the "single" designation in identifier 48). A separate field 50 in this particular table carries the designation "withdrew", allowing this information to be included in the certificate. Field 52 defines the conferred degree(s) ("optional", "multiple") and any specific honors as shown in field 54 (with the "honors") defined by indicators 56 and 58 as "optional" and "multiple", respectively.

It is to be understood that this listing of fields as shown in field identification table 30 is exemplary only, and others may be included. However, in no case will an education institution be permitted to verify certain types of information, such as "employment status", "citizenship", "military service record" or the like, which are all better verified by different organizations. Thus, in accordance with the present invention, the MC issued by an OC such as Yale University will be limited to including information solely associated with the individual's educational credentials. Similarly, an MC issued by an OC such as a corporation will be limited only to employment history, an MC issued by an OC such as the US Air Force will be limited only to military service, etc. Part of the vetting process of the CA in contemplated to include working with the organization to decide on the particular fields to be included in an MC. It is expected that if the adoption of this process becomes widespread, colleges and universities would agree on a standard list of fields in an MC issued to confirm the grant of degrees, so that further automated processing could be implemented.

In accordance with the present invention, there may be additional checks built into table 30 to verify its contents. For example, in the specific arrangement of table 30, both the "graduated" and "withdrew" fields 48 and 50 should not be "true"; they are intended to be options where only one is present. A semantics check can be applied to prevent this type of error from entering the table. Additionally or alternatively, another field could be included—defined as "final status"—with the value selected from a drop-down menu of values withdrew, transferred, graduated, expelled, current_student.

Referring back to the specific listing associated with MC 10 as shown in FIG. 2, it is seen that MC 10 includes <degree2> as an optional field, in addition to <matriculated2> and <graduated2>. It is clear that this allows for an MC to be created that includes information in the <matriculated2> field without anything being entered in the <degree2> field—a meaningless type of certification. To avoid this problem, the field identification table can be augmented to include two additional indicators—"requires" and "produces". FIG. 6 includes a portion of an exemplary field identification table 50 that utilizes these indicators to ensure that the supplied information is valid.

As it is written, table 50 is redundant. It shows that <degree2> produces information for both <matriculated2> and <graduated2>, where this is equivalent to <matriculated2> requires <degree2>. For simplicity, the table can be organized such that a field that requires another field will be acceptable whether the second field is "required/optional", "single/multiple". The browser extension that validates the MC will simply check that an instance of the first field is in the certificate when it encounters the second field. This may require two readings of the certificate. The first pass would identify the fields in the certificate, and the second pass would verify that the conditions specified by the requires and produces indicators are met.

Since each OC will contain the contact information for both the issuing organization and the CA, the default action on any error is to reject the OC for use in validating the corresponding MC (and will also cause all MCs signed by that OC to be rejected). The processing software, most likely the browser extension, may suggest that the user of the OC contact one or more of these entities. Typical errors include, but are not limited to, expired signing key, bad signature, unmatched beginning and ending tags, missing mandatory tags, offered tag not included in field descriptors, and inclusion of "multiple" types of data in fields defined as "single".

If a website contains an MC, an individual attempting to verify the MC will also need to obtain the corresponding OC. One solution to this is to maintain a website that stores all current OCs. A browser extension or plug-in in a user's machine can then access the OC website in much the same manner that an anti-virus program periodically downloads virus signatures on a regular basis.

Alternatively, the OC and MC can be combined into a single package, called a Combined Certificate (CC), that is located on the member's website. FIG. 7 illustrates an exemplary CC 60, which includes specific delimiters that are used to signify the demarcation between an OC 20 and an MC 10. As shown, CC 60 is signed with the organization's private key and OC 20 is signed with the CA's private key.

Figure 8:
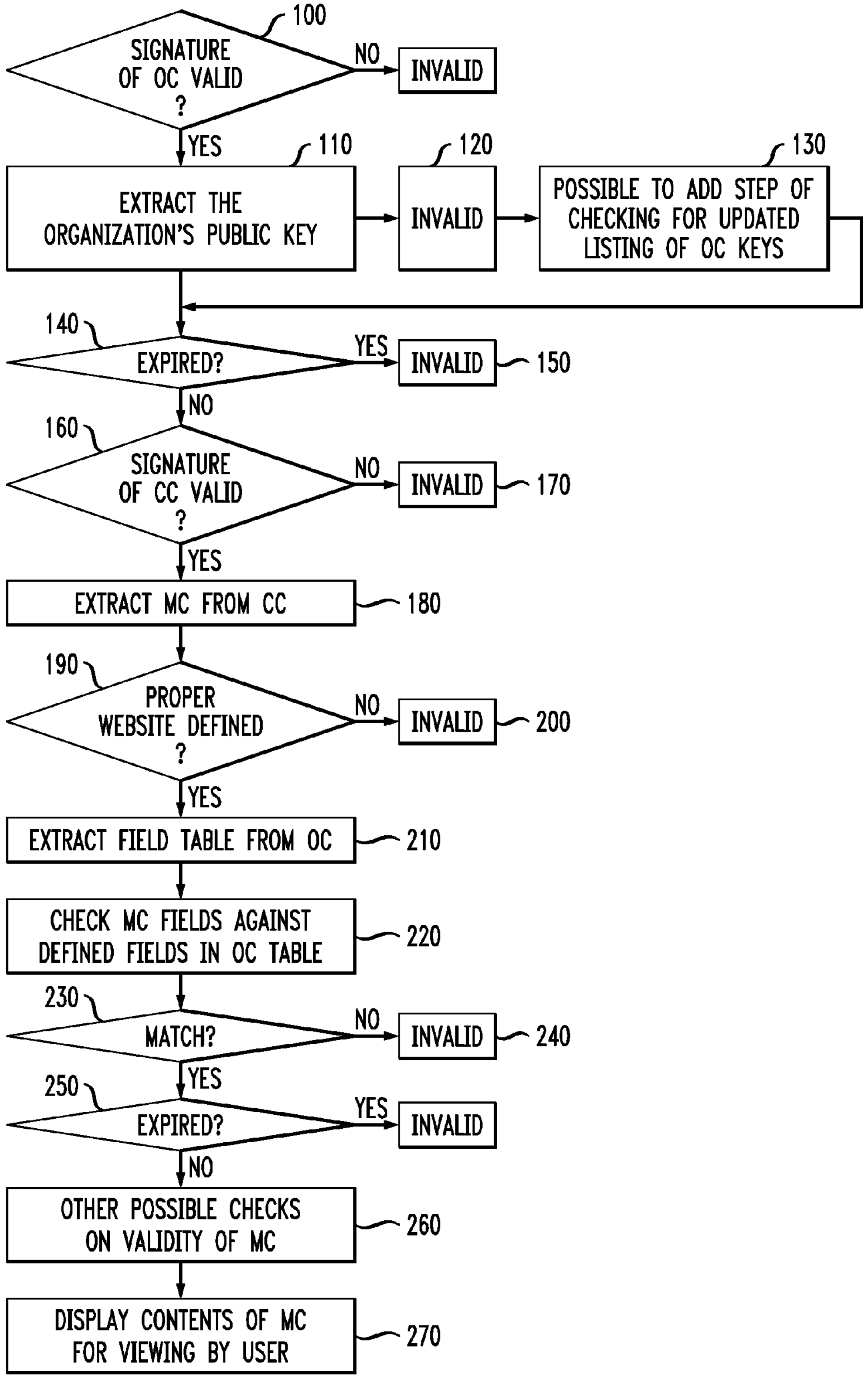
FIG. 8 is a flowchart of an exemplary process for verifying a presented MC in accordance with the present invention.

A specific process flow associated with accessing and verifying an MC using the specific CC as shown in FIG. 7 is included in the flowchart of FIG. 8. In general, the process proceeds to first isolate OC 20 within CC 60, and then extract MC 10 and verify its contents with respect to OC 20.

Referring to the flowchart of FIG. 8, the process begins with verifying the signature of OC 20 (step 100). It is assumed that the browser extension contains an initial set of CA public keys that can be used to verify the signature of OC 20. If the CA signature is correct against one of these keys, then OC 20 is considered valid, and the organization public key is extracted from OC 20 (step 110). Otherwise, processing stops by the user's browser and an "error" is reported (step 120). Once an error is reported, the information contained within both OC 20 and MC 10 is considered invalid and not displayed to the user by the web browser. Instead, the user is informed that CC 60 is not valid as a result of problems with the CA keys. It is possible that a failure to find the correct CA public key will trigger a remote search for an update to the cache of CA public keys (step 130), where if found, the process will move forward to step 140.

In either case, once the OC public key is extracted, the expiration date of OC 20 is checked against the current time and date (step 140). If the time period has passed (or not yet started), an error is reported (step 150) and processing is halted, with no information displayed to the user other than an error message. Presuming that the public key is valid, it is then used to verify the signature of CC 60 (step 160). Again, if not verified, the process is halted with an error message (step 170). Presuming that the signature of CC 60 is valid, the next step in the process (step 180) proceeds to extract MC 10 from CC 60 and the <website> is checked against the location (the URL) shown in CC 60 (step 190). If there is no match, the process terminates (step 200). The organization can be notified at this point that an unscrupulous individual is attempting to use a membership certificate created for another individual.

Presuming the <website> matches the CC, pointer 26 in OC 20 is used to access the fields within MC 10 (step 210) and the fields within the MC are checked against field identification table 30 (step 220), performing a comparison operation at step 230. If the fields are not properly populated (e.g., "required" fields are missing, "single" fields have a "multiple" designation), or if semantics checks are not "true", or the MC attempts to include information not specified in table 30, the process is terminated (step 240) and the user is "warned" that the MC under review is not valid. Otherwise, the process continues by checking the expiration date of CC 60 itself (step 250).

Other checks (step 260), as described below, may be added to the process to further ensure the validity of MC 10. Once all of the tests have been completed, the contents of MC 10 are displayed for view by the user (step 270), providing a visual confirmation of the specific properties of the certificate (e.g., confirmation of the website owner being a graduate of Yale University).

In particular, if the user's browser supports querying "history", then a check can be made that the "previous page" corresponds to the <website> included in the MC. To further control the authentication of the MC, it may be configured to include a locally-known (i.e., "secret") security phrase in a locally-chosen (i.e., "secret") color which are used to avoid "playback attacks" and are local to the user's browser. Without this phrase, a bad website could simply provide a web page that looks like the verification of the offered MC. Therefore, unless the "secret phrase"—printed in the "secret color"—appears in the process of checking the certificate, the user will know that someone is trying to present a false certificate to him.

It is also possible to include a "check" of revoked OCs during the verification process. For example, a CA may wish to revoke the OC of a specific organization. In that case, the CA wants to ensure that all MCs issued by the "bad" organization are voided. In this case, the user's browser extension would query the CA for its certificate revocation list (CRL). It may be that the OC is checked by recursing up the chain of CAs (if there are multiple CAs present) from the initial/issuing CA to the root. This allows for all of the OCs issued by a "bad" CA to be revoked at once.

If the specific OC associated with the current process is not on the listing, then the extension could query the organization itself to determine if the specific MC has been revoked. This would require that MC's, like X.509 certificates, be issued with a unique ID. In any case, the browser extension may report the use of a revoked CC (based on the MC) to the issuing organization using an error reporting mechanism. This would allow the issuing organization to pursue the owner of the website and insist that the CC be removed.

The components in the block diagrams and the steps in the flowchart described above are described only as exemplary. The components and steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the process described above may be performed in a different order within the scope of the illustrative embodiments.

Thus, a computer implemented method, apparatus and computer program product are provided in the illustrative embodiments for verifying and enforcing the use of organization certificates and member certificates in accordance with the present invention. The invention can take the form of an entirely hardware embodiment, an entirely software embodiments, or an embodiment containing both hardware and software elements. In a preferred embodiment, the invention is implemented in software, which includes but is not limited to firmware, resident software and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device). Examples of computer-readable medium including a semiconductor or solid state member, magnetic tape, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit other computer-readable program code over a communications link. This communications link may use a medium that is, for example without limitation, physical or wireless.

The description of the present invention has been presented for the purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for verifying a membership certificate of a purported member of an identified organization, represented as an icon on a purported member's website, the computer implemented method comprising activating the membership certificate icon;

retrieving the membership certificate linked to the icon, the membership certificate comprising a field identifying an organization that issued the membership certificate and a payload section including specific information pertaining to the purported member, the specific information structured by specific fields;

retrieving an organization certificate associated with the identified organization that created the membership certificate, the organization certificate including a predetermined set of information elements defining the membership, the predetermined set of information elements structured by fixed fields defined by tie identified organization and included a pointer to a separate table comprising specific tagged fields that are populated by the identified organization when creating the membership certificate;

comparing the presented elements in the membership certificate with the predetermined set of information elements within the organization certificate; and verifying the membership certificate if and only if the specific fields structured in the membership certificate match the predetermined set of fixed fields structured within the organization certificate as defined by the identified organization.

2. The computer implemented method as defined in claim 1 wherein the organization certificate is created by a bona fide certification authority (CA) and the method includes the step of validating the organization certificate with respect to the certification authority.

3. The computer implemented method as defined in claim 1 wherein a local computer performing the method includes a cache of valid organization certificates.

4. The computer implemented method as defined in claim 1 wherein a local computer performing the method obtains a listing of current and valid organization certificates from a network database.

5. The computer implemented method as defined in claim 1 wherein the comparison of the membership certificate specific fields to the organization certificate predetermined fixed fields includes a check for inclusion of required information within each specific field.

6. The computer implemented method as defined in claim 1 wherein the comparison of the membership certificate specific fields to the organization certificate predetermined fixed fields includes a check for only a single occurrence of an information element for a predetermined specific field defined as not permitting multiple entries.

7. The computer implemented method as defined in claim 1 wherein the method comprises the step of verifying that the organization certificate is properly signed and has not expired.

8. The computer implemented method as defined in claim 1 wherein the method comprises the step of verifying that the membership certificate has not expired.

9. The computer implemented method as defined in claim 1 wherein the organization certificate and the membership certificate are presented as combined certificate, with the organization certificate first verified before verifying the membership certificate.

10. A computer usable program product comprising a non-transitory computer usable medium including computer usable code for verifying a membership certificate of a purported member of an identified organization, the membership certificate represented by an icon on a purported member's website, the computer usable code comprising computer usable code for activating the membership certificate icon;

computer usable code for retrieving the membership certificate linked to the icon, the membership certificate comprising a field identifying an organization that issued the membership certificate and a payload section including specific information pertaining to the purported member, the specific information structured by specific fields;

computer usable code for retrieving an organization certificate associated with the identified organization that created the membership certificate, the organization certificate including a predetermined set of information elements defining the membership, the predetermined set of information elements structured by fixed fields defined by the identified organization and included a pointer to a separate table comprising specific tagged fields that are populated by the identified organization when creating the membership certificate;

computer usable code for comparing the presented elements in the membership certificate with the predetermined set of information elements within the organization certificate; and computer usable code for verifying the membership certificate if and only if the specific fields structured in the membership certificate match the predetermined set of fixed fields structured within the organization certificate as defined by the identified organization.

11. The computer usable program product as defined in claim 10 wherein the organization certificate is created by a bona fide certification authority (CA), the computer usable program code for validating the organization certificate with respect to the certification authority.

12. The computer usable program product as defined in claim 10, wherein the computer usable code performs the step of retrieving a local cache of valid organization certificates.

13. The computer usable program product as defined in claim 10, wherein the computer usable code performs the step of retrieving valid organization certificates from a network database.

14. The computer usable program product as defined in claim 10, wherein the computer usable code performs the step of checking the membership certificate specific fields for an inclusion of required information within each specific field.

15. The computer usable program product as defined in claim 10, wherein the computer usable code performs the step of checking for only a single occurrence of an information element for a predetermined specific field defined as not permitting multiple entries.

16. The computer usable program product as defined in claim 10, wherein the computer usable code performs the step of verifying that the organization certificate is properly signed and has not expired.

17. The computer usable program product as defined in claim 10, wherein the computer usable code performs the step verifying that the membership certificate has not expired.

18. The computer usable program product as defined in claim 10 wherein the organization certificate and membership certificate are presented as a combined certificate with specific delimiters used to signify the demarcation between the organization certificate and the membership certificate, with the computer usable code performing the step of verifying the organization certificate portion before verifying the membership certificate portion of the combined certificate.

19. A system for verifying a membership certificate of a purported member of an identified organization, represented as an icon on a purported member's website, the system comprising a first hardware element including computer usable code means for activating the membership certificate icon;

a second hardware element including computer usable code means for retrieving the membership certificate linked to the icon, the membership certificate comprising a field identifying an organization that issued the membership certificate and a payload section including specific information pertaining to the purported member, the specific information structured by specific fields;

a third hardware element including computer usable code means for retrieving an organization certificate associated with the identified organization that created the membership certificate, the organization certificate including a predetermined set of information elements defining the membership, the predetermined set of information elements structured by fixed fields defined by the identified organization and included a pointer to a separate table comprising specific tagged fields that are populated by the identified organization when creating the membership certificate;

a fourth hardware element including computer usable code means for comparing the presented elements in the membership certificate with the predetermined set of information elements within the organization certificate; and a fifth hardware element including computer usable code means for verifying the membership certificate if and only if the specific fields structured in the membership certificate match the predetermined set of fixed fields structured within the organization certificate as defined by the identified organization.

20. The system as defined in claim 19 wherein the organization certificate is created by a bona fide certification authority (CA) and the system further comprises a sixth hardware element including computer usable code means for validating the organization certificate with respect to the certification authority.

21. The system as defined in claim 19, wherein the third hardware element including computer usable code means performs the step of retrieving a local cache of valid organization certificates.

22. The system as defined in claim 19, wherein the third hardware element including computer usable code means performs the step of retrieving valid organization certificates from a network database.

23. The system as defined in claim 19, wherein the fifth hardware element including computer usable code performs the step of checking the membership certificate specific fields for an inclusion of required information within each specific field.

24. The system as defined in claim 19, wherein the fifth hardware element including computer usable code means performs the step of checking for only a single occurrence of an information element for a predetermined specific field defined as not permitting multiple entries.

25. The system as defined in claim 19, wherein the fifth hardware element including computer usable code means performs the step of verifying that the organization certificate is properly signed and has not expired.

26. The system as defined in claim 19, wherein the organization certificate and membership certificate are presented as a combined certificate with the fifth hardware element including computer usable code means first performing a verification of the organization certificate portion and then performing a verification of the membership certificate portion.

27. The system as defined in claim 19, wherein the fifth hardware element including computer usable code means performs the step verifying that the membership certificate has not expired.

* * * * *